(12) United States Patent
Müller et al.

(10) Patent No.: US 11,143,168 B2
(45) Date of Patent: Oct. 12, 2021

(54) ROTOR BLADE INSPECTION RIG

(71) Applicant: WP SYSTEMS GMBH, Ruhland (DE)

(72) Inventors: Holger Müller, Sebnitz (DE); Jan Boesner, Dresden (DE); Robert Höfner, Dresden (DE); Ole Renner, Dresden (DE); Michael Zavesky, Dresden (DE)

(73) Assignee: WP SYSTEMS GMBH, Ruhland (DE)

( * ) Notice: Subject to any disclaimer, the term of this patent is extended or adjusted under 35 U.S.C. 154(b) by 153 days.

(21) Appl. No.: 16/310,037

(22) PCT Filed: Jun. 14, 2017

(86) PCT No.: PCT/DE2017/100499
§ 371 (c)(1),
(2) Date: Dec. 14, 2018

(87) PCT Pub. No.: WO2017/215711
PCT Pub. Date: Dec. 21, 2017

(65) Prior Publication Data
US 2019/0257295 A1    Aug. 22, 2019

(30) Foreign Application Priority Data

Jun. 17, 2016 (DE) .................... 10 2016 111 129.5
Nov. 8, 2016 (DE) .................... 10 2016 121 273.3

(51) Int. Cl.
*F03D 80/30* (2016.01)
*F03D 80/50* (2016.01)
(Continued)

(52) U.S. Cl.
CPC ............ *F03D 80/50* (2016.05); *E04G 3/243* (2013.01); *E04G 3/32* (2013.01);
(Continued)

(58) Field of Classification Search
CPC ... F03D 80/50; F05B 2230/80; F05B 2240/57
See application file for complete search history.

(56) References Cited

U.S. PATENT DOCUMENTS 7,374,405 B2 *  5/2008  Wobben ................. B66C 1/108
                                                416/244 R
7,934,585 B2 *  5/2011  Iversen ................... F03D 80/50
                                                182/142
(Continued)

FOREIGN PATENT DOCUMENTS

CA    2341398 A1 *  3/2000 ............ F03D 13/20
CN    102583198 A     7/2012
(Continued)

OTHER PUBLICATIONS

International Search Report issued by the European Patent Office in International Application PCT/DE2017/100499.

*Primary Examiner* — Alvin C Chin-Shue
(74) *Attorney, Agent, or Firm* — Ursula B. Day, Esq.

(57) ABSTRACT

Disclosed is a rotor blade inspection device having a maintenance chamber through which a rotor blade can pass vertically, wherein the floor opening and a roof opening, through which the rotor blade can pass, are arranged in the chamber floor and in the chamber roof of the maintenance chamber, characterized in that the maintenance chamber is arranged on a supporting frame, and in that the bracing frame can be supported on a tower of a wind turbine, and in that the chamber floor and the chamber roof of the maintenance chamber are respectively designed as a diaphragm system in order to minimize a gap between the floor opening or roof opening and the rotor blade.

14 Claims, 6 Drawing Sheets

(51) Int. Cl.
*E04G 3/24* (2006.01)
*E04G 3/32* (2006.01)
*E04G 3/28* (2006.01)

(52) U.S. Cl.
CPC .... *E04G 2003/286* (2013.01); *F05B 2230/80* (2013.01); *F05B 2240/57* (2013.01); *Y02B 10/30* (2013.01); *Y02E 10/72* (2013.01)

(56) References Cited

U.S. PATENT DOCUMENTS

| | | | |
|---|---|---|---|
| 8,397,382 B2* | 3/2013 | Anasis | F03D 80/50 29/889.1 |
| 2009/0020361 A1* | 1/2009 | Teichert | E04G 3/30 182/36 |
| 2011/0127109 A1* | 6/2011 | Teichert | F03D 80/50 182/19 |
| 2011/0303488 A1* | 12/2011 | Besselink | E04G 3/30 182/142 |
| 2011/0318496 A1* | 12/2011 | Jensen | F03D 80/50 427/427.3 |
| 2012/0003089 A1* | 1/2012 | Byreddy | B08B 3/024 416/61 |
| 2018/0238309 A1* | 8/2018 | Flindt | F03D 13/40 |

FOREIGN PATENT DOCUMENTS

| | | |
|---|---|---|
| DE | 199 09 698 C2 | 4/2000 |
| DE | 101 18 906 A1 | 11/2002 |
| DE | 103 18 675 A1 | 11/2004 |
| DE | 2007 002 930 U1 | 5/2008 |
| DE | 2010 060 639 A1 | 5/2012 |
| ES | 1 072 052 | 5/2010 |

* cited by examiner

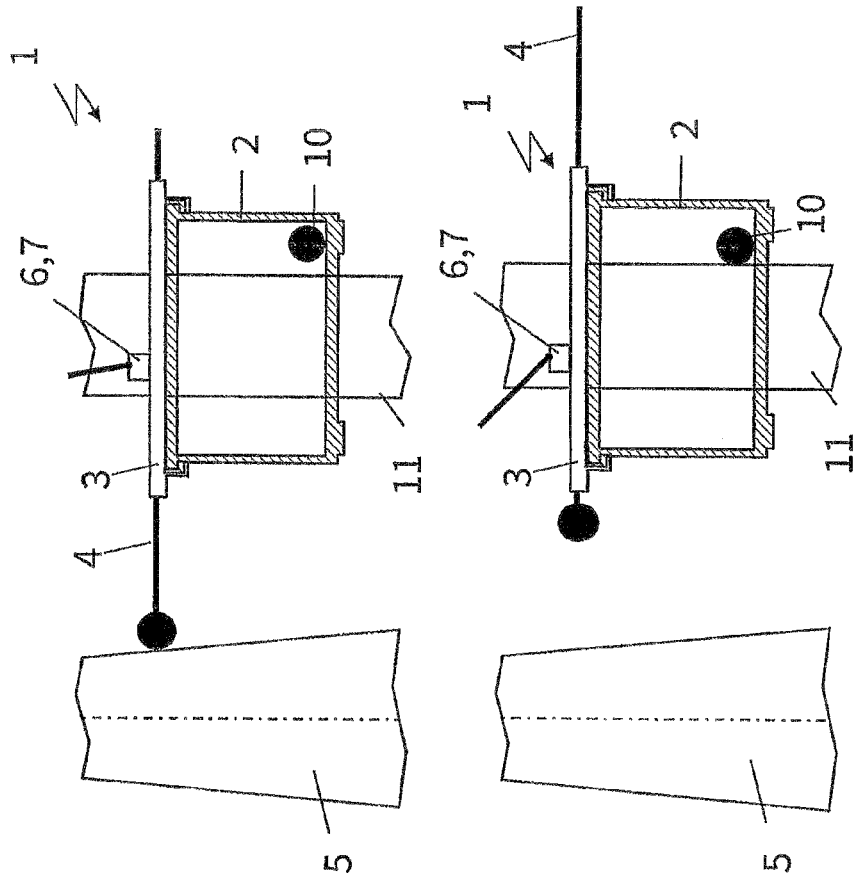

ROTOR BLADE INSPECTION RIG

CROSS-REFERENCES TO RELATED APPLICATIONS

This application is the U.S. National Stage of International Application No. PCT/DE2017/100499, filed Jun. 14, 2017, which designated the United States and has been published as International Publication No. WO 2017/215711 and which claims the priority of German Patent Application, Serial No. 10 2016 111 129.5 filed Jun. 17, 2016, and 10 2016 121 273.3 filed Nov. 8, 2016 pursuant to 35 U.S.C. 119(a)-(d) the description of which is hereby incorporated by reference.

BACKGROUND OF THE INVENTION

The invention relates to a rotor-blade inspection rig that is used, in particular, for the inspection, maintenance and repair of rotor blades on wind turbines.

A multiplicity of designs of rotor-blade inspection rigs, in the form of work platforms, lifting platforms or devices for the repair and servicing of rotor blades of wind turbines, are known in the prior art.

For example, DE 10 2010 060 639 A1 provides a work platform rig for full-circumference inspection of rotor blades of wind turbines. The work platform has a carrying means that is moved, on a crane cable of a load crane, vertically along the rotor blade. The work platform is supported on the mast of the wind turbine and is of a lightweight construction, and is optimized such that an approximately horizontal position of the work platform is realized even in the case of uneven loading.

DE 103 18 675 B4 provides a lifting platform for inspection rigs for maintenance of the rotor blades of wind turbines, having a plurality of platform elements arranged around an opening for the rotor blade. The lifting platform can be adapted to the dimensions of the rotor blade by moving at least one platform element relative to the other platform elements. The platform elements are displaceably guided, parallel to each other, on transverse carriers, and are equipped with a continuously variable distance adjustment.

Disclosed in DE 20 2007 002 930 U1 is a lifting platform for wind turbines, wherein two platform elements are connected to each other by means of a pivoting joint. An adaptation to the geometry of the rotor-blade contour is effected, within certain limits, by the pivoting of the movable platform elements.

DE 199 09 698 C2 discloses a device for performing repair and servicing work, in particular on rotor blades of wind turbines. This device is characterized in that a work cabin is provided with sealing devices, enabling the work cabin to be sealed off with respect to the environmental conditions prevailing at the site. In this case, the rotor blades, of fiber-reinforced plastic or aluminum, are partially accommodated by the work cabin and, for the purpose of executing repair and servicing work, the interior can be sealed outwardly by means of a multiplicity of sealing devices realized as push-rods.

The known designs of rotor-blade inspection rigs according to the prior art still have some major disadvantages.

Quite generally, large distances between the walkable platforms of the inspection rigs and the rotor-blade surface result in unfavorable accessibility for the service personnel in inspecting, servicing and repairing the rotor blades.

Moreover, the possibility even for an inspection chamber, realized as a maintenance chamber, to be sealed thermally against the environment, or in respect of weather influences such as wind, rain and snow, is reduced because of the dimension of the distances, or gap. This has the result that the inspection rigs according to the prior art have only limited application, in particular weather conditions.

Furthermore, there is the problem that the cross-sectional dimensions of rotor blades of wind turbines vary greatly from the rotor-blade tip to the rotor-blade root. Matching the structural design of the inspection rigs to these geometries presents problems, since the inspection rigs are then restricted to particular rotor-blade types and cannot be used universally for a multiplicity of geometries.

Furthermore, the rotor blades themselves have a so-called twist, by which is meant a twist of the cross section, over the length of the rotor blade, of up to 20 degrees.

Typical rotor-blade inspection rigs are thus normally designed as open systems, but this results in the aforementioned relatively large gap dimensions between the inspection rig and the rotor blade.

Conventional rotor-blade inspection rigs normally consist of a support structure of aluminum or steel, having an integrated bracing frame for supporting the platforms on the tower. Mounted on a carrying frame are walkable, open platforms of aluminum or steel that surround the rotor blade. Normally, the resultant opening between the platforms does not match, or only partially matches, the cross-sectional shape of the rotor blades, necessarily resulting in relatively large gaps between the rotor blade and the platform. Furthermore, the inspection rigs are fastened to the nacelle of the wind turbine by means of two suspension cables and two securing cables made of steel, only the suspension cables being in engagement in normal operation. Endless cable winches, by which the platforms are moved vertically, are normally fastened to the outer sides of the platforms of the inspection rigs. The bracing frame integrated in the carrying frame can be displaced in the horizontal direction relative to the inspection rig, such that the distance between the inspection rig and the tower can be adjusted. Usually, devices are also provided for tilt adjustment, to enable resulting differences in the inclination of the platforms to be compensated.

Furthermore, it is usual for the open platforms to be provided with railings in the direction of the rotor blade and in the direction of the outer sides. It is also known to reduce the platform by folding or adjusting individual modules to the width permissible for road transport.

A particular disadvantage of the prior art consists in that, for differing rotor-blade sizes, it is necessary to use inspection rigs that are adapted to these sizes, in order to minimize the gap between the platform and the rotor-blade surface. As a result, it is necessary to use differing rotor-blade inspection rigs for dissimilar rotor-blade cross sections.

Overall, it is found that the relatively large gaps, which impede maintenance work, can only be reduced to a limited extent by the prior art, and in the main have to be accepted. A further problem of inspection rigs according to the prior art consists in that, owing to the highly inclined orientation of the suspension cables, the inspection rigs frequently cannot advance as far as the region of the rotor-blade root. A cause that may be mentioned is the overloading of the cable winches that occurs as a result of the inclined orientation of the cables, which results in automatic switch-off of the cable winches if a particular overload level is exceeded.

The known problems are only partly solved by designs according to the prior art.

SUMMARY OF THE INVENTION

The object of the invention thus consists in realizing a rotor-blade inspection rig in such a manner that it can be adapted in a variable manner to differing geometries and dimensions of rotor blades. Furthermore, it is intended that only a small amount of effort is required to convert the inspection rig to a variety of rotor blades, and that the inspection rig can be easily transported between differing deployment locations, with maximum working safety and a high degree of convenience, with optimal working conditions, for the user of the inspection rig.

The object is achieved by an item having the features a bracing frame configured for support on a tower of a wind turbine; a carrying frame connected to the bracing frame such as to allow movement of the bracing frame in relation to the carrying frame; and a maintenance chamber arranged on the carrying frame and configured for passage of a rotor blade in a vertical direction, said maintenance chamber including a chamber floor with a floor opening and a chamber roof with a roof opening to allow passage of the rotor blade, the chamber floor and the chamber roof each configured as a diaphragm system to minimize a gap between the floor opening or roof opening and the rotor blade. Developments are specified in the dependent claims.

The object of the invention is achieved, in particular, by a rotor-blade inspection rig that is composed substantially of a maintenance chamber through which a rotor blade can pass vertically, and which is arranged on a carrying frame. The carrying frame can be supported, by means of a bracing frame, on a tower of a wind turbine. A floor opening and a roof opening, through which a rotor blade can pass, are arranged respectively in the chamber floor and in the chamber roof of the maintenance chamber, the chamber floor and the chamber roof each being realized as a diaphragm system in order to minimize a gap between the floor and roof openings and the rotor blade.

Advantageously, the bracing frame is integrated into the carrying frame for the purpose of supporting the rotor-blade inspection rig on the mast.

Advantageously in this case, the bracing frame is realized so as to be displaceable in the horizontal direction relative to the carrying frame, such that the position of the bracing frame can be used to set the distance of the rotor-blade inspection rig from the tower of the wind turbine. The telescopic guidance of the bracing frame in relation to the carrying frame is particularly advantageous.

BRIEF DESCRIPTION OF THE DRAWING

The maintenance chamber is preferably arranged in a suspended manner on the carrying frame.

According to a particularly advantageous design of the invention, the maintenance chamber is mounted so as to be rotatable relative to the carrying frame. In this way, the maintenance chamber can follow the twist of the rotor blade without the necessity of adjusting the diaphragm system.

Figure 1:
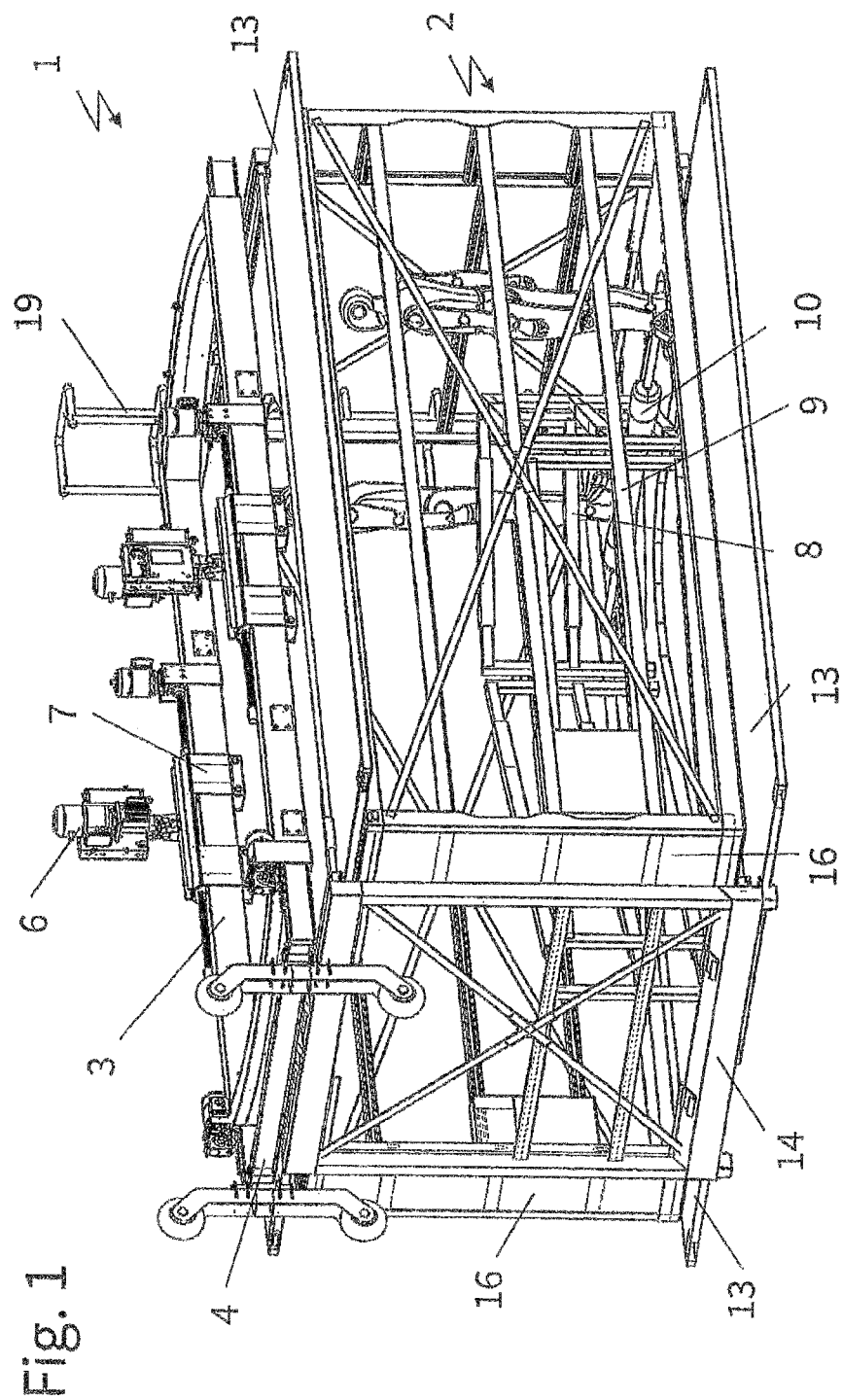

For this purpose, particularly preferably, the maintenance chamber is mounted on the carrying frame so as to be rotatable by means of rollers or other guide elements.

Advantageously in this case, the maintenance chamber is realized so as to be rotatable about the rotation axis of the rotor blade.

The maintenance chamber is preferably composed of a structural frame, and of cladding elements for the lateral faces of the maintenance chamber, to form a working space that is largely closed off outwardly.

The lateral faces of the maintenance chamber and/or the lateral faces of the balconies are thus preferably realized such that they can be closed, in particular the lateral faces are realized so as to be closable by suitable lightweight construction materials or tarpaulins, in order to realize heating of the maintenance chamber and weather protection.

In a particularly preferred variant, the chamber is composed of a support structure having slim steel, aluminum or plastic struts, the spaces between which can be closed with plastic tarpaulins.

Alternatively, the maintenance chamber is realized as a light cell made of fiber-reinforced plastic or aluminum.

Preferably, the volume of the maintenance chamber is realized such that it can be enlarged by means of at least one lateral element that can be moved telescopically. The lateral element is designed in the manner of a balcony that can be drawn out or extended out of the maintenance chamber. The lateral delimiting walls of the lateral elements in this case are also preferably realized so as to be closable, in order to delimit the enlarged maintenance chamber volume with respect to the environment, in particular in the case of adverse weather conditions. The lateral elements, or the balconies, thus enlarge the chamber floor and the chamber roof telescopically, thereby improving the working conditions for the service engineers.

Particularly preferably, two lateral elements are provided, which are realized so as to be displaceable relative to the maintenance chamber and at right angles to the rotor-blade sides. It is also advantageous and expedient to design the telescoping lateral elements such that they can be locked with respect to the maintenance chamber.

The diaphragm system, for the purpose of reducing the gap between the walkable platform and the rotor blade, is preferably composed of a fixed roof element or a fixed floor element and of one, two or more positionable diaphragm elements. Clearly, in the design of the maintenance chamber with a chamber roof and a chamber floor, the diaphragm system is preferably, but not necessarily, realized in both platforms. The positionable diaphragm elements are disk-type or plate-type elements realized so as to be movable in a guided manner in a plane. In the case of embodiments having a plurality of diaphragm elements, they act together in a diaphragm system to achieve the closure or opening of a surface area. The diaphragm elements, singly and in the combination of the diaphragm system, are statically of such a condition that they can be walked on. The diaphragm elements are thus preferably realized as disks or plates that can be displaced individually or jointly in relation to each other.

The diaphragm elements are advantageously realized such that they can be moved translationally or pivotally or rotationally. Likewise, a plurality of motion types can be executed in an overlaid manner.

According to an advantageous development of the invention, the diaphragm system is realized as a ring diaphragm.

According to a particularly preferred design, the diaphragm system is realized so as to be rotatable in the horizontal plane. This embodiment makes it possible to follow the twist of the rotor blade without the necessity of moving the maintenance chamber itself.

A further advantageous design consists in that the position of the diaphragm elements is adapted depending on the travel path of the maintenance chamber and the twist of the rotor blade.

Preferably, on the side that faces toward the rotor blade and that may possibly come into contact with the latter, the positionable diaphragm elements of the diaphragm system are designed so as to be concave and to correspond to the outer contour of the rotor blade. This already reduces the gap size significantly, particularly in the case of designs of diaphragm systems having only few diaphragm elements.

According to a particularly advantageous design, the diaphragm elements of the diaphragm system have a seal, toward the rotor-blade outer contour, that can then come into direct contact with the rotor blade without damaging the latter.

Preferably, brush seals or inflatable sealing elements are used as seals.

For the purpose of adapting to large rotor-blade contours, the carrying frame can be enlarged laterally, and in particular is also realized so as to be telescopic.

Cable feedthrough winches, or also other winches, are preferably provided for driving the rotor-blade inspection rig in the vertical direction. It is particularly advantageous to mount the cable feedthrough winches so as to be horizontally displaceable, such that a tilt compensation system is created for the rotor-blade inspection rig, and the tilt of the maintenance chamber can thus be adjusted.

In order that the roof of the maintenance chamber can also be used as an additional work platform, it is realized as a solid roof element, and advantageously has a roof access.

The carrying frame is connected to the maintenance chamber in a form-fitting manner.

The feed roller is connected to the maintenance chamber and mounted so as to be horizontally displaceable relative to the latter. It enables the maintenance chamber to be supported horizontally on the front edge of the rotor blade. This support additionally acts to support the bracing frame on the tower, but may also be used as a sole support. In the case of sole support by the feed roller, an inclination of the suspension cables is reduced, particularly in the case of inspections close to the blade root, with the result that the inspection system can advance closer to the blade root. Furthermore, in the case of sole support of the maintenance chamber on the rotor blade, there is the possibility of rotating the chamber, together with the carrying frame, with the blade twist. This also can have the result that the maintenance system can advance further, as far as the rotor blade, than is possible with present-day inspection systems.

Important aspects and designs of the invention thus consist in the following points.

Firstly, the concept of the invention consists in providing a rotor-blade inspection rig, as a maintenance system having a closed maintenance chamber, which is constructed from a structural frame and mounted on a carrying frame, a bracing frame being realized to support the entire construction on a tower of a wind turbine so as to be movable horizontally relative to the carrying frame.

For the purpose of optimally adapting the floor and roof structure of the maintenance chamber to the rotor-blade cross section, for a minimal distance from the rotor blade, a one-, two- or multi-part translationally positionable diaphragm system is provided with a contour matched to the cross section of the rotor blade.

The diaphragm itself, or the entire chamber, is realized so as to be rotatable about the vertical axis, to enable adaptation to the twist of the rotor blade on the vertical travel path of the maintenance chamber.

Good transport possibilities and a variety of application possibilities are achieved in that a solid maintenance chamber, having extendable lateral parts, is provided, which, following completion of road transport, can either be fixed in the maximal position or can be positioned continuously, relative to the size of the rotor blade, and enlarged telescopically.

A particular advantage consists in that, owing to the realization of a maintenance chamber having a walkable, solid floor element and a roof element, the rotor-blade inspection rig according to the invention provides two levels on which work can be performed. This is particularly advantageous in the case of working close to the blade root, since in many cases the latter cannot be reached by a lifting platform that has only one platform, because of the oblique cable angle.

It must also be mentioned as being particularly advantageous that the tilt inclination is reduced significantly. This is rendered possible by the greater vertical distance between the suspension at the upper carrying frame and the chamber support at the rotor-blade front edge, by means of the feed roller. In general, it is the case that: the greater the vertical distance between the suspension of the suspension cables and a horizontal support point of the chamber, the fewer the problems with cable inclination.

A further advantage consists in that, owing to the use of support structures to create a chamber, a high degree of lightweight construction can be implemented.

A further advantage consists in that, owing to the adaptability of the rotor-blade inspection rig to the respective geometry of the rotor blades, a great variety of wind turbine types and rotor blade geometries can be covered.

A particular advantage furthermore consists in that the twist, which is the twist of the rotor blades in the vertical direction, can be taken into account by the rotor-blade inspection rig according to the invention, in that the entire maintenance chamber, or alternatively only the diaphragm system of the maintenance chamber, turns with the twist.

A considerable improvement in the working conditions is also achieved by the possibility of temperature control and conditioning of the maintenance-chamber space conditions with parameters that can be set in a defined manner, such as temperature, humidity and dust content.

It is to be emphasized, as being particularly advantageous, that the gaps between the rotor blade and the inspection rig are minimized, and the service engineers can thus more easily execute a proper repair on the rotor blades. Furthermore, optimal temperatures can be set for the handling and working of fiber composite materials in the maintenance chamber. This relates, in particular, to optimal air humidity, to an optimal temperature and, to a large extent, optimized workshop conditions, and a proper tool provision can also be provided in the chamber.

In summary, the light-construction support structure, the working on two levels and an improved accessibility of the blade root may be cited as advantages. Furthermore, a simple static seal is rendered possible for the first time by short distances between the rotor blade and the inspection rig. There is a low risk of falling for workers and work equipment, and a high degree of worker safety, since there is a redundancy of the safety means, with fastening means and railings.

A high quality of servicing can thus be achieved, and there is a minimized risk of damage to the rotor blade, since the support is effected uniformly, with a large surface area on the rotor blade, and wind loads during the servicing work are directed uniformly into the blade.

The sealing of the maintenance chamber now also makes it possible for any sanding dust produced, and other chemical wastes, to be extracted by suction in a defined manner.

The high-quality repair prolongs the operational performance of wind turbines and thus optimizes the generation of electricity by means of renewable energies.

The resource-intensive, complete replacement of rotor blades by means of energy-intensive crane techniques is minimized.

Owing to the closed system, a substantial improvement in the repair quality can be achieved.

The ability of the rig to adapt in respect of size enables servicing work to be performed on almost all types of rotor blades of standard wind turbines, with only one rotor-blade inspection rig.

The doubling of the levels enables work to be performed simultaneously at a plurality of locations, and enables working on extensive areas of damage.

The use of proper tools also enables working times to be reduced.

The simplified inspection results in better possibilities for damage identification by means of technical aids.

Further details, features and advantages of designs of the invention are given by the following description of exemplary embodiments, with reference to the associated drawings. There are shown:

PREFERRED EMBODIMENTS

Figure 2:
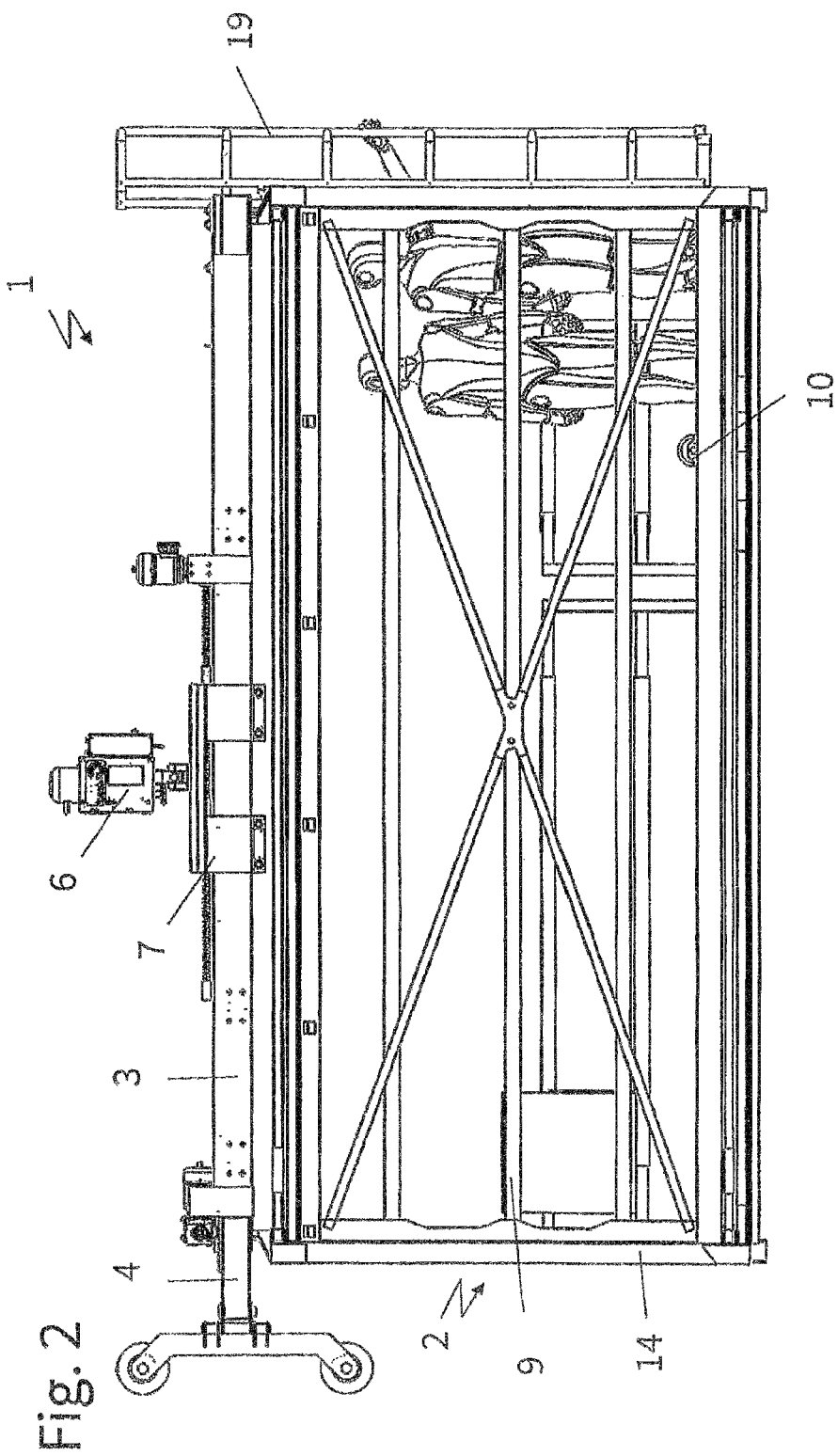
Figure 3:
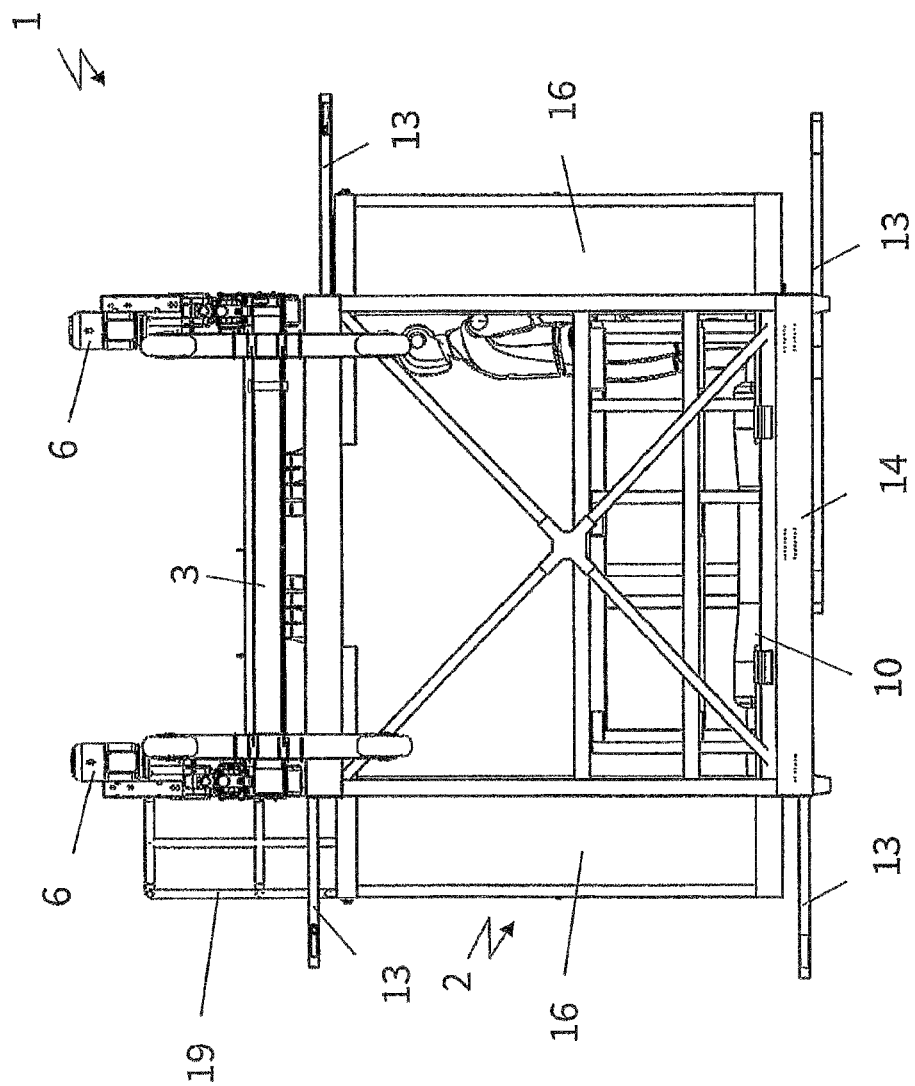
Figure 4A:
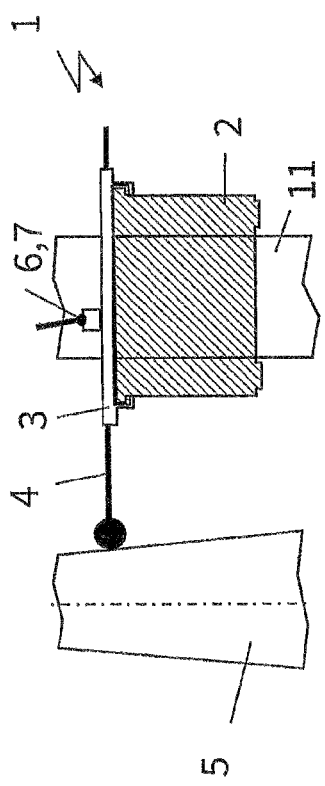
Figure 4B:
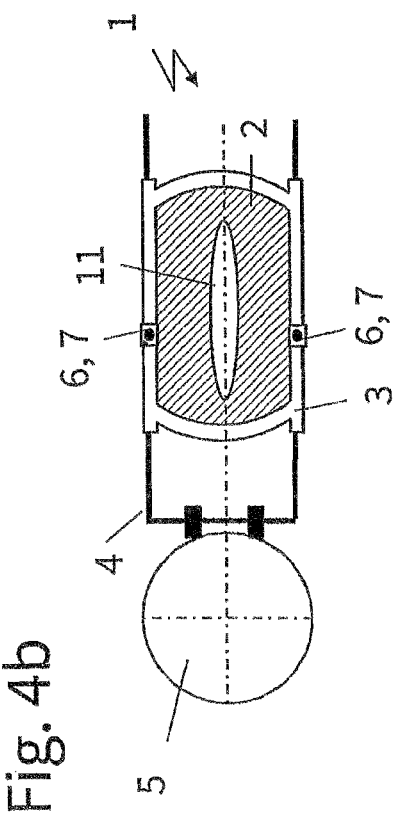
Figure 4C:
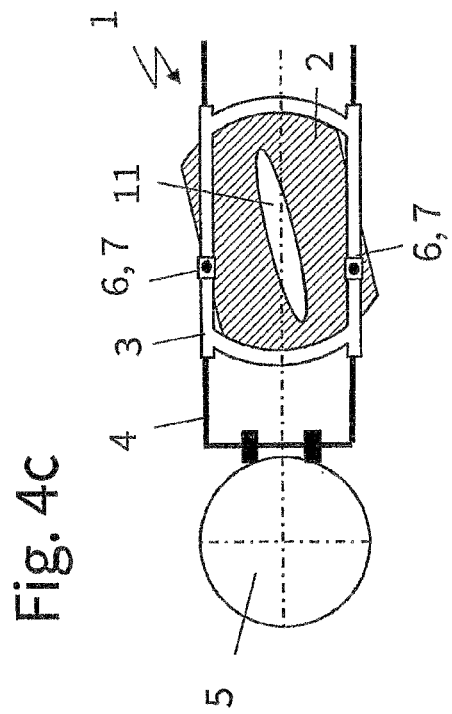
Figure 6A:
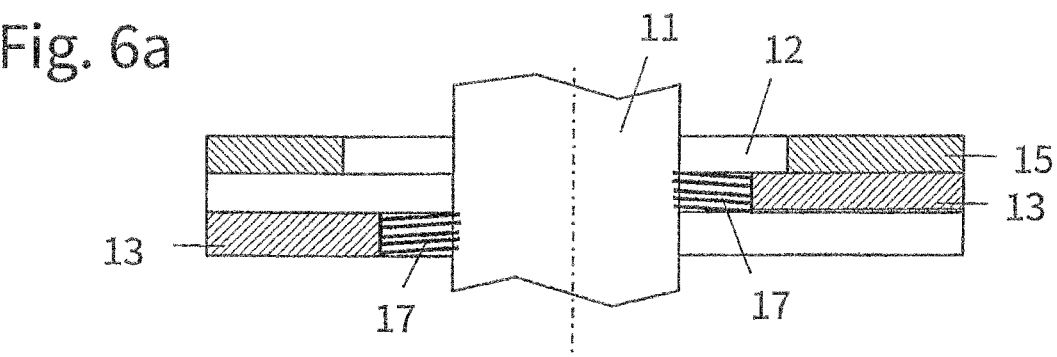
Figure 7A:
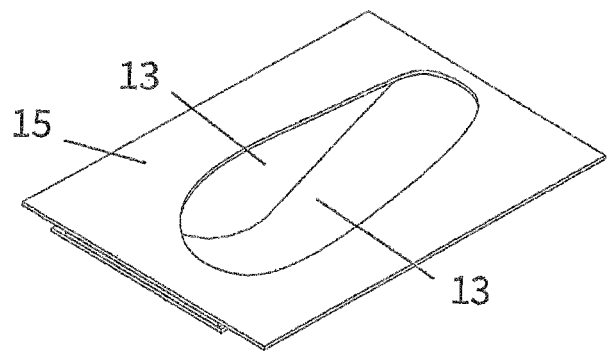
Figure 7B:
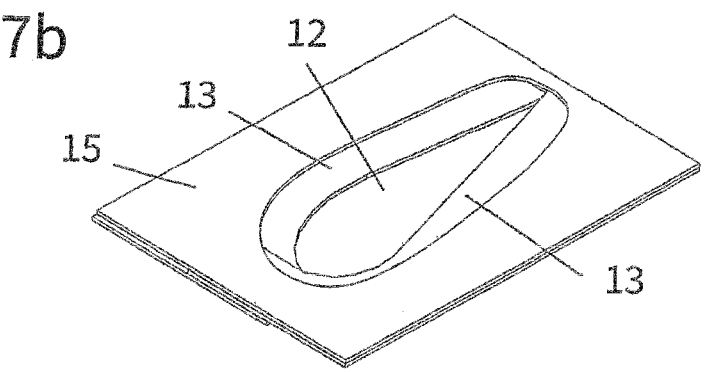

FIG. 1: rotor-blade inspection rig, perspective representation,
FIG. 2: rotor-blade inspection rig, in side view,
FIG. 3: rotor-blade inspection rig, in front view,
FIG. 4a: rotor-blade inspection rig, in side view,
FIG. 4b: rotor-blade inspection rig, in top view,
FIG. 4c: rotor-blade inspection rig, in top view with rotated chamber,
FIG. 5a: rotor-blade inspection rig with rotor blade in side view, with support on tower,
FIG. 5b: rotor-blade inspection rig with rotor blade in side view, with support on rotor blade,
FIG. 6a, b: seal system with brushes and inflatable seals,
FIG. 7a: diaphragm system with fully closed diaphragms, and
FIG. 7b: diaphragm system with opened diaphragms.

A rotor-blade inspection rig 1 is shown in various views in FIGS. 1 to 3.

FIG. 1 shows a perspective representation of the rotor-blade inspection rig 1, which is composed substantially of a maintenance chamber 2, which is suspended on a carrying frame 3. The carrying frame 3 is connected to the bracing frame 4, which is guided therein. The bracing frame 4 leans against the tower 5, not represented here, of the wind turbine.

Structurally, the represented rotor-blade inspection rig 1 is composed of an upper carrying frame 3, which is formed from two longitudinal beams that run parallel to the lateral faces of the rotor blade, and from steel, aluminum or fiber composite material. The beams are each structurally connected to each other by lateral braces. Fastened to the upper carrying frame 3 are cable feedthrough winches 6 or other winches, which drive the maintenance system in the vertical direction. The cable feedthrough winches 6 are mounted on the carrying frame 3 so as to be displaceable horizontally by means of the tilt compensation system 7, whereby the tilt of the maintenance system can be adjusted. Integrated into the carrying frame 3 is the bracing frame 4, which supports the maintenance system relative to the tower 5 of the wind turbine. The bracing frame 4 is displaceable in the horizontal direction relative to the rotor-blade inspection rig 1.

A maintenance chamber 2 is mounted on the upper carrying frame 3 such that it can turn relative to the carrying frame 3. The maintenance chamber 2 is preferably composed of a closed structure, which provides protection, against rain wind and cold, to the engineers working therein.

The maintenance chamber 2 is supported in the horizontal direction on the upper carrying frame 3, such that the upper carrying frame 3, the maintenance chamber 2 and the feed roller 10, arranged on the chamber floor, form an overall structure that can be subjected to shear loading.

In the vertical direction, the maintenance chamber 2 is supported on the upper carrying frame 3. The weight force of the maintenance chamber 2 is thus transferred to the upper carrying frame 3.

In the horizontal direction, the following distinct load paths ensue. In the case of support on the tower 5 by means of the bracing frame 4, the horizontal loads are lead directly into the upper carrying frame 3. In the case of support on the rotor-blade front edge by means of the feed roller 10, the horizontal loads are transmitted, in the form of a shear load, through the maintenance chamber 2, into the upper carrying frame 3, which is connected in a form-fitting manner to the upper side of the maintenance chamber 2.

The maintenance chamber 2 is preferably configured as described and represented in the following.

The maintenance chamber 2 is preferably composed of a light cell, of a support structure of high-strength steel struts, of fiber-reinforced plastics or aluminum, the solid structural frame 14. The intermediate spaces of the support structure are sealed, on the front side of the chamber, by sealing elements such as, for example, light plastic tarpaulins. The sealing elements are preferably transparent.

The maintenance chamber 2 preferably has a rectangular cross section, the long sides enclosing the rotor-blade sides and the short sides enclosing the rotor-blade edges, the front and rear edge of the rotor blade.

The long sides are composed of separate elements, the lateral elements or balconies, which can be displaced, or extended, relative to the chamber cell, at right angles to the rotor-blade sides. In the extended position, they can be locked with respect to the maintenance chamber 2.

The balconies 16 also are preferably composed of a light-construction support structure, for example of fiber-composite or aluminum sandwich elements.

The lateral faces of the balconies 16 are preferably open, and may be sealed manually, for instance by a roller door, a shutter or a tarpaulin. The sealed elements of the balcony lateral faces are preferably transparent.

The maintenance chamber 2 is preferably suspended on the upper carrying frame 3 by rollers or other guide elements. The guidance is configured such that the maintenance chamber 2 can move on a circular path about the twist axis of the rotor blade, relative to the carrying frame 3.

The maintenance chamber 2 is such that, in principle, it is possible both to walk on the chamber floor and to walk on the chamber roof. Maintenance works can thus be performed on both levels. The chamber floor can be walked on because of a solid, walkable floor element, and the roof can be walked on because of a solid, walkable roof element and the roof access 19. The walkability of the roof allows, particularly in the region of the rotor-blade root, better access for maintenance works that frequently cannot be covered with the use of conventional rigs.

The open sides of the maintenance chamber 2 to the outside, both floor and roof, are delimited by an outer railing 9. The regions in the maintenance chamber 2 toward the rotor blade 11 are secured by an inner railing 8. In order to reduce the height of the overall system, the upper railings are fastened in a foldable, telescoping or demountable manner to the chamber roof.

The diaphragm system is an essential element of the rotor-blade inspection rig 1, in order to encompass and seal the outer contour of, for example, a rotor blade 11. The diaphragm system of the chamber base and chamber roof, in particular according to FIGS. 6a,b and 7a,b, is composed of a walkable, solid floor element or roof element 15 and of one or more movable, positionable and possibly also walkable diaphragm elements 13, which can be moved at right angles to the rotor-blade sides.

The chamber floor and the chamber roof have a central cut-out, the floor opening, or roof opening 12, which corresponds to the contour of the largest possible blade cross sections of the anticipated rotor blades 11.

The diaphragm elements 13 are mounted parallel to each other on planes that are offset in the vertical direction, and as a result can also be positioned in an overlapping manner.

The diaphragm elements 13, in the maximally closed state, together with the solid floor element 15 or the solid roof element 15 of the fixed balcony 16, form a closed floor, the latter extending over a plurality of levels. In this state, large regions of the diaphragm elements 13 overlap, and these are moved maximally in the direction of the center of the chamber.

When the positionable diaphragm elements 13 are in the maximally opened state, there is a resultant opening, the floor and ceiling opening 12, in the center of the chamber. The movable diaphragm elements 13 are contoured in the direction of the rotor blade 11 such that they can be moved very close to the respective rotor-blade surface, for differing blade types and cross-sectional sizes, and thus a minimal peripheral gap is obtained. An ideal gap dimension is obtained in this case by the rotation of the maintenance chamber 2 in combination with the positioning of the contoured diaphragm elements 13.

In a special alternative embodiment of the maintenance system, the maintenance chamber 2 is fixed with respect to the carrying frame 3. Here, as an alternative to the aforementioned variant, the rotation is realized by means of the diaphragm system itself. The diaphragm elements 13 thus execute both a rotational and a translational motion.

The described diaphragm system is also intended for open rotor-blade inspection rigs, the function of the sealing then being reduced to the fall protection.

Particularly preferably, the positionable diaphragm elements 13 of the diaphragm system are dimensioned, mounted and guided in such a manner that they themselves can be walked on, such that simplification is achieved for particular works on the rotor blades.

Possibilities for the fastening of occupants are provided both on the floor level and on the roof level of the maintenance chamber 2. The fastening of occupants is to be understood to mean the securing of persons or objects, which are connected, for example by means of a cable, to the maintenance chamber 2.

The maintenance chamber 2 is equipped with a device that, during the maintenance operation, enables occupants to change over safely from the floor level to the roof level and vice versa. For this purpose, in the exemplary embodiment represented, a roof access 19 is provided, which can be used as a ladder out from the interior of the maintenance chamber 2 for changing over from the floor level to the roof level of the maintenance chamber 2.

In a particular embodiment of the maintenance system, for the maintenance of rotor blades 11 having particularly large cross sections, the distance between the two longitudinal beams of the carrying frame 3 can be varied between the transport state and the maintenance state. Increasing this distance ensures that even rotor blades 11 having a profile width of more than 2.55 m can be inspected.

The maintenance chamber 2 has a solid structural frame 14 having a maximum width of 2.55 m, in order to comply with legal regulations for simplified road transport. The lateral elements 16 of the maintenance chamber 2, also referred to as balcony elements, are extendable, and in the extended state increase the chamber volume.

The method for inspecting rotor blades 11 for inspection and maintenance purposes by means of a rotor-blade inspection rig 1 of the described type is described in the following.

The maintenance chamber 2 is driven, in the closed transport state, on a towed vehicle, to the wind turbine. On the ground, the lateral balconies 16 are extended and fixed in position. The railings of the roof level, which are not represented, are folded out. No further work for assembly of the maintenance chamber 2 is then required.

According to a particular embodiment of the maintenance chamber 2, the balconies 16 are not fixed in place once, but are continuously positioned during the service operation.

The maintenance chamber 2 travels, with a fully closed diaphragm system, and thus with a completely closed floor, to the rotor-blade tip, a continuous tilt compensation being effected manually or automatically.

Before the rotor-blade tip, the positionable diaphragm elements 13 are opened completely.

There follows a manual or automatic feed-in of the rotor-blade tip into the roof opening, if necessary assisted by the occupants of the maintenance chamber 2.

In addition, the chamber is rotated manually or automatically, such that the chamber sides are oriented parallel to the rotor-blade sides.

The maintenance chamber 2 is locked at the fed-in rotor blade 11 by advancing the diaphragm elements 13 until the support elements on the insides of the diaphragm have contact with the rotor blade 11.

The advancing of the positionable diaphragm elements 13 is effected with force limitation or travel limitation, such that the rotor blade 11 does not incur any damage.

For the purpose of advancing the maintenance chamber 2 along the rotor blade 11, the movable diaphragm elements 13 are opened fully or partially, or advanced by means of closed-loop and open-loop control means.

FIG. 2 shows the rotor-blade inspection rig 1 according to FIG. 1 in side view. The roof access 19 is arranged in a rear corner of the maintenance chamber 2. The outer railing 9 securely delimits the maintenance chamber 2 for the persons present in the chamber, even if claddings of the lateral faces have not been fitted. The solid structural frame 14 forms the structural core of the maintenance chamber, on which the railings and cladding elements are fixed, or can be fixed if required. A longitudinal beam of the carrying frame 3 accommodates the longitudinal beam of the bracing frame 4 in a telescopic manner, and the latter is guided linearly in the carrying frame 3. The tilt compensation system 7 consists in the guiding and positioning of the cable feedthrough winches 6 along the longitudinal beam of the carrying frame 3, the tilt compensation system 7 additionally having means for driving and controlling the positioning.

In FIG. 3, the rotor-blade inspection rig 1 of FIGS. 1 and 2 is represented in front view, in the radial direction out from the tower. The lateral elements 16 are in an extended position, and in this state the maintenance chamber 2 has an increased chamber volume, which improves the accessibility and freedom of movement for the service engineers. The positionable diaphragm elements 13 in the chamber roof and in the chamber floor are also in an extended position. Additionally represented in front view are the transverse braces of the structural frame 14 and of the carrying frame 3, and the feed roller 10, arranged transversely in relation to the maintenance chamber 2, in the floor region, is indicated in the drawing. The two cable feedthrough winches 6 are arranged so as to be positionable along the two longitudinal struts of the carrying frame 3, and the roof access 19 is extended with a lateral element 16. The extended lateral elements 16 form balcony-type enlargements of the maintenance chamber 2, and are therefore also referred to as balconies.

The rotor-blade inspection rig 1 is represented in highly schematic form in FIGS. 4a, b and c.

In FIG. 4a, the rotor-blade inspection rig 1 is shown in side view. The maintenance chamber 2 is suspended on the carrying frame 3 and arranged so as to be rotatable in the horizontal, and the bracing frame 4 is extended out of the carrying frame 3 and is supported on the tower 5 of the wind turbine. The rotor blade 11 extends vertically through the maintenance chamber 2. The rotor-blade inspection rig 1 is held by the cable, shown extending upward, on which the cable feedthrough winch 6, with the tilt compensation system 7, engages.

FIGS. 4b and 4c show the rotor-blade inspection rig 1 in top view. The tower 5 of the wind turbine is shown in cross section, as a circle, against which the bracing frame 4 presses. The bracing frame 4 is accommodated by the carrying frame 3, on which the maintenance chamber is suspended. The bracing frame 4 is guided in a linear guide in the carrying frame 3, and in each inspection state is in alignment with the tower 5 of the wind turbine. The cable feedthrough winches 6 on both longitudinal struts of the carrying frame 3 receive the cable, coming from above from the direction of view, and are positionable along the carrying frame 3 by means of the tilt compensation system 7. The rotor blade 11 is represented in cross section.

In FIG. 4c the maintenance chamber is shown having been turned, and it thus follows the twist of the rotor blade 11 in the vertical direction. The rotation axis for the maintenance chamber 2 in this case is located in the axis of the twist of the rotor blade 11. The adaptation of the position of the maintenance chamber 2 to the twist of the rotor blade 11 is effected by turning the maintenance chamber 2 relative to the fixed carrying frame 3.

FIGS. 5a and 5b show rotor-blade inspection rigs 1 with a received rotor blade 11 in differing positions of the maintenance chamber 2 with respect to the rotor blade 11.

In FIG. 5a, the rotor-blade inspection rig 1 is guided, by means of the adjustable bracing frame 4, on the tower 5 of the wind turbine. The tilt compensation is effected by means of displaceable cable feedthrough winches 6 on a tilt compensation system 7. In the position represented, the cable is only slightly inclined, the rotor-blade inspection rig 1 is located in the lower to middle region of the vertically adjusted rotor blade 11 of the wind turbine. The higher the rotor-blade inspection rig 1 is raised, the greater the cable inclination. The support of the maintenance chamber 2 by means of the carrying frame 3 and the bracing frame 4 is effected as far as an approach to approximately 10 m to the blade root, or to the rotor hub.

FIG. 5b shows a position of the rotor-blade inspection rig 1 with a greater cable inclination. In the case of such inclinations of the cable, the rotor-blade inspection rig 1 becomes unstable and can no longer be guided safely, by means of the adjustable bracing frame 4, on the tower 5 of the wind turbine, by means of rollers of the bracing frame 4. In this region, a feed roller 10 is brought into engagement under automatic control, in order to increase the vertical support distance and thus to reduce the cable inclination. In this way, it is made possible to inspect the rotor blade 11 by means of the rotor-blade inspection rig 1 as far as the blade root of the rotor blade 11. The bracing frame 4 in this case is brought out of engagement and the rotor-blade inspection rig 1 is guided completely on the rotor blade 11. The tilt compensation is effected by means of displaceable cable feedthrough winches 6 on a tilt compensation system 7.

Figure 6B:
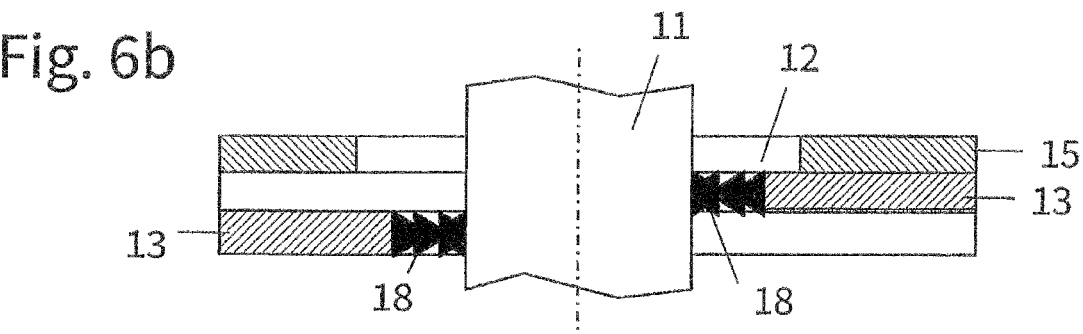

FIGS. 6a and 6b show details of the sealing of the diaphragm system in relation to the rotor blade 11. The solid floor or roof element 15 forms the upper delimitation of the diaphragm system and is designed to be walkable.

The small gap between the positionable diaphragm elements 13 and the rotor blade 11 renders possible the integration of a sealing system 17, 18 for thermal insulation and for protection against wind and against the ingress of rainwater or snow.

In FIG. 6a, arranged as sealing elements on the diaphragm element 13 are plastic brushes, as a brush seal 17, the brushes of which are oriented horizontally along the inner contour of the movable diaphragm elements 13.

Alternatively, as shown in FIG. 6b, the sealing is realized by means of inflatable sealing elements 18 or by a combination of a brush seal 17 and inflatable sealing elements 18.

There are radially oriented support elements such as, for example, rollers or slide elements, not illustrated, installed along the contour of the movable diaphragm elements 13 to absorb lateral loads, for instance in the case of side wind.

Represented in FIGS. 7a and 7b are the solid floor element 15, or the solid roof element 15 of the diaphragm systems of the chamber floor or chamber roof of a maintenance chamber 2. The positionable diaphragm elements 13 are translationally displaceable in relation to each other, in order to minimize the gap toward the rotor blade. The remaining gap is closed by the previously described sealing system. The elements of the diaphragm system, composed of a fixed floor element/roof element 15 and two positionable diaphragm elements 13, which are arranged over each other, are indicated in the illustrations by the representation of the lateral faces.

Shown perspectively in top view in FIG. 7a is the diaphragm system with the solid floor element/solid roof element 15 with the diaphragm elements 13 completely closed, and therefore a completely closed floor and ceiling opening 12. This state is preferably assumed during the approach to and during the departure from the rotor-blade tip, and in the transport state.

The diaphragm system is represented in the opened position in FIG. 7b, in which the floor/roof opening 12 for the rotor blade 11 can be seen as a contour.

The diaphragm elements 13 in this case are completely extended, and the maintenance chamber 2 is thus ready to receive the rotor blade 11.

LIST OF REFERENCES 1 rotor-blade inspection rig
2 maintenance chamber
3 carrying frame
4 bracing frame
5 tower
6 cable feedthrough winch
7 tilt compensation system
8 inner railing
9 outer railing
10 feed roller
11 rotor blade
12 floor opening, roof opening 13 positionable diaphragm element
14 solid structural frame
15 solid roof element/solid floor element
16 lateral element, balcony
17 brush seal
18 inflatable sealing element
19 roof access

What is claimed is:

1. A rotor-blade inspection rig, comprising:
a bracing frame configured for support on a tower of a wind turbine;
a carrying frame connected to the bracing frame such as to allow movement of the bracing frame in relation to the carrying frame; and
a maintenance chamber arranged on the carrying frame and configured for passage of a rotor blade in a vertical direction, said maintenance chamber including a chamber floor with a floor opening and a chamber roof with a roof opening to allow passage of the rotor blade, the chamber floor and the chamber roof each configured as a diaphragm system to minimize a gap between the floor opening or the roof opening and the rotor blade, said maintenance chamber rotatable in a horizontal plane wherein a rotation axis of the maintenance chamber coincides with an axis of the rotor blade and a twist in the rotor blade such that the maintenance chamber is turned relative to the fixed carrying frame.

2. The rotor-blade inspection rig of claim 1, wherein the bracing frame is constructed so as to be displaceable in the horizontal direction relative to the carrying frame, and guided telescopically.

3. The rotor-blade inspection rig of claim 2, wherein the maintenance chamber is suspended on the carrying frame.

4. The rotor-blade inspection rig of claim 1, wherein the maintenance chamber is composed of a structural frame and cladding elements for the lateral faces of the maintenance chamber, to form a working space that is largely closed off outwardly.

5. The rotor-blade inspection rig of claim 1, wherein a volume of the maintenance chamber is configured to be enlarged by means of at least one lateral element that is moved telescopically.

6. The rotor-blade inspection rig as claimed in claim 5, further comprising two lateral elements configured for displacement relative to the maintenance chamber and positioned at right angles to the rotor-blade sides, and lockable with respect to the maintenance chamber.

7. The rotor-blade inspection rig of claim 1, wherein the diaphragm system is composed of a solid roof element or a solid floor element and of one, two or more movable diaphragm elements.

8. The rotor-blade inspection rig as claimed in claim 7, wherein the diaphragm elements are realized such that they move translatory or rotationally or is pivoted.

9. The rotor-blade inspection rig of claim 8, wherein the diaphragm system is realized as a ring diaphragm.

10. The rotor-blade inspection rig of claim 7, wherein the diaphragm system is configured to be rotatable in the horizontal plane.

11. The rotor-blade inspection rig of claim 7, wherein the diaphragm elements of the diaphragm system have a seal toward an outer edge of the rotor-blade.

12. The rotor-blade inspection rig of claim 1, further comprising a tilt compensation system having cable feedthrough winches, said tilt compensation system drives the rotor-blade inspection rig in the vertical direction, wherein the cable feedthrough winches are mounted so as to be horizontally displaceable by which the tilt of the rotor-blade inspection rig is adjusted.

13. The rotor-blade inspection rig of claim 1, wherein the maintenance chamber is provided with a roof access in the roof of the maintenance chamber.

14. The rotor-blade inspection rig of claim 1, wherein the maintenance chamber is provided with a feed roller for additionally or solely guiding the maintenance chamber on the rotor blade in the region of a blade root.

* * * * *